US012327885B2

(12) United States Patent
Dong et al.

(10) Patent No.: US 12,327,885 B2
(45) Date of Patent: Jun. 10, 2025

(54) BATTERY CELL, BATTERY THAT USES SAME, AND ELECTRIC DEVICE

(71) Applicant: Ningde Amperex Technology Limited, Ningde (CN)

(72) Inventors: Hui Dong, Ningde (CN); Jianpeng Chen, Ningde (CN)

(73) Assignee: NINGDE AMPEREX TECHNOLOGY LIMITED, Ningde (CN)

(*) Notice: Subject to any disclaimer, the term of this patent is extended or adjusted under 35 U.S.C. 154(b) by 661 days.

(21) Appl. No.: 17/696,324

(22) Filed: Mar. 16, 2022

(65) Prior Publication Data

US 2022/0311105 A1    Sep. 29, 2022

(30) Foreign Application Priority Data

Mar. 24, 2021 (CN) .......................... 202110313966.0

(51) Int. Cl.
*H01M 50/538* (2021.01)
*H01M 10/0587* (2010.01)

(52) U.S. Cl.
CPC ..... *H01M 50/538* (2021.01); *H01M 10/0587* (2013.01)

(58) Field of Classification Search
CPC .................. H01M 50/538; H01M 10/0587
See application file for complete search history.

(56) References Cited

U.S. PATENT DOCUMENTS

2008/0044728 A1*  2/2008  Schmidt et al.
2008/0233474 A1    9/2008  Son et al.

FOREIGN PATENT DOCUMENTS

| CN | 3246967   | A1 | * | 11/2017 |
| CN | 206976501 | U  |   | 2/2018  |
| CN | 208173682 | U  | * | 11/2018 |
| CN | 208352449 | U  | * | 1/2019  |
| CN | 111341993 | A  |   | 6/2020  |
| CN | 211789341 | U  |   | 10/2020 |
| CN | 211907597 | U  | * | 11/2020 |

(Continued)

OTHER PUBLICATIONS

CN 208173682 U Machine Translation (Year: 2018).*

(Continued)

*Primary Examiner* — Niki Bakhtiari
*Assistant Examiner* — Lilian Alice Odom
(74) *Attorney, Agent, or Firm* — WHDA, LLP

(57) ABSTRACT

A battery cell includes an electrode assembly, a tab, a first connecting piece, and a second connecting piece. The electrode assembly includes a first end face and a second end face that are disposed opposite to each other, and a first surface and a second surface that are connected to the first end face and the second end face respectively. The tab protrudes from first end face. The first connecting piece surrounds the first end face and is connected to the first surface and the second surface separately. A first via hole is made on the first connecting piece. The tab is threaded out of the first via hole. The second connecting piece surrounds the second end face and is connected to the first surface and the second surface separately. A plurality of second via holes are made on the second connecting piece.

20 Claims, 6 Drawing Sheets

(56) References Cited

FOREIGN PATENT DOCUMENTS

CN 112635922 A 4/2021
EP 3 923 406 A2 12/2021

OTHER PUBLICATIONS

CN 211907597 U Machine Translation (Year: 2020).*
CN 208352449 U Machine Translation (Year: 2019).*
First Office Action dated Jan. 24, 2022, issued in counterpart CN Patent Application No. 202110313966.0, w/ English translation (13 pages).

* cited by examiner

BATTERY CELL, BATTERY THAT USES SAME, AND ELECTRIC DEVICE

CROSS-REFERENCE TO RELATED APPLICATIONS

This application claims the benefit of priority from the Chinese Patent Application No. 202110313966.0, filed on Mar. 24, 2021, which is incorporated herein by reference in its entirety.

TECHNICAL FIELD

This application relates to the technical field of lithium-ion batteries, and in particular, to a battery cell, a battery containing the battery cell, and an electric device containing the battery.

BACKGROUND

The mature application of consumer electronic products is drawing more attention of users to the risks arising from the use of the products. For example, higher requirements are posed on the anti-drop performance of the electronic products. As an important part of the electronic products, a battery also needs to meet requirements on the anti-drop performance.

The battery generally includes a housing, an electrode assembly, and a tab. The electrode assembly is accommodated in the housing. The tab is electrically connected to the electrode assembly, and protrudes from the housing to connect to an external component. During dropping of the battery, a separator of the electrode assembly is prone to shrink under the impact of an electrolytic solution, causing the electrode assembly to short-circuit, generate heat, or catch fire. In the prior art, multiple pieces of adhesive tape are affixed to the head and the end of the electrode assembly separately to prevent the separator from shrinking. However, according to this solution in the prior art, the separator located in the gaps between pieces of adhesive tape is not fastened and is prone to shrink. In addition, it is not practicable to affix the adhesive tape at the position of the tab. Consequently, the separator located at the position of the tab is prone to shrink, resulting in short-circuit and fire hazards and impairing the safety of the battery in use.

SUMMARY

To overcome the foregoing disadvantages in the prior art, it is necessary to provide a battery cell.

An embodiment of this application provides a battery cell. The battery cell includes an electrode assembly, a tab, a first connecting piece, and a second connecting piece. The electrode assembly includes a first end face and a second end face that are disposed opposite to each other, and a first surface and a second surface that are connected to the first end face and the second end face respectively. The tab protrudes from the first end face. The first connecting piece surrounds the first end face and is connected to the first surface and the second surface separately. A first via hole is made on the first connecting piece. The tab is threaded out of the first via hole. The second connecting piece surrounds the second end face and is connected to the first surface and the second surface separately. A plurality of second via holes are made on the second connecting piece.

In this embodiment of this application, the first connecting piece surrounding the first end face and the second connecting piece surrounding the second end face are disposed. The first end face and the second end face are fastened in the thickness direction of the electrode assembly, thereby preventing shrinkage of the separator at any position on the first end face and the second end face. With the first via hole made available for threading out the tab, the separator located at the tab can be fastened, thereby preventing shrinkage of the separator at the tab.

In some possible implementations, the electrode assembly is formed by sequentially stacking and then winding a first electrode plate, a separator, and a second electrode plate; or the electrode assembly is formed by sequentially stacking the first electrode plate, the separator, and the second electrode plate. Edges of the separator at both the first end face and the second end face exceed corresponding edges of the first electrode plate and the second electrode plate. The first connecting piece and/or the second connecting piece are connected to an excess part of the separator separately. With the first connecting piece and/or the second connecting piece connected to the excess part of the separator, the separator is fixed in the length direction of the electrode assembly, thereby further avoiding shrinkage of the separator.

In some possible implementations, the first connecting piece and the second connecting piece each include a first substrate layer and a first bonding layer disposed on the first substrate layer. The first bonding layer bonds to the electrode assembly.

In some possible implementations, the battery cell further includes a third connecting piece disposed on the first surface or the second surface. The third connecting piece includes a second substrate layer and a second bonding layer disposed on the second substrate layer. The second bonding layer bonds to the electrode assembly.

In some possible implementations, the third connecting piece further includes a third bonding layer. The third bonding layer is disposed between the second substrate layer and a housing of a battery. The third bonding layer bonds to the housing when heated.

In some possible implementations, an area of a cross section that is of the second bonding layer and that is parallel to the corresponding first surface or second surface is larger than an area of a cross section that is of the third bonding layer and that is parallel to the corresponding first surface or second surface. The area of the cross section of the third bonding layer is smaller than the area of the cross section of the second bonding layer. Therefore, the stress generated during dropping is concentrated on the edge of the third bonding layer instead of the edge of the second bonding layer, thereby mitigating the problem of tearing the aluminum foil.

In some possible implementations, in a length direction or a width direction of the electrode assembly, a spacing between an edge of the third bonding layer and a corresponding edge of the second bonding layer is 1 mm to 60 mm.

In some possible implementations, the first connecting piece, the second connecting piece, and the third connecting piece are integrally formed.

Another embodiment of this application further provides a battery. The battery includes a housing and any one of the foregoing battery cells. The battery cell is disposed in the housing.

Another embodiment of this application further provides an electric device. The electric device includes any one of the foregoing batteries.

REFERENCE NUMERALS OF MAIN COMPONENTS

Figure 1:
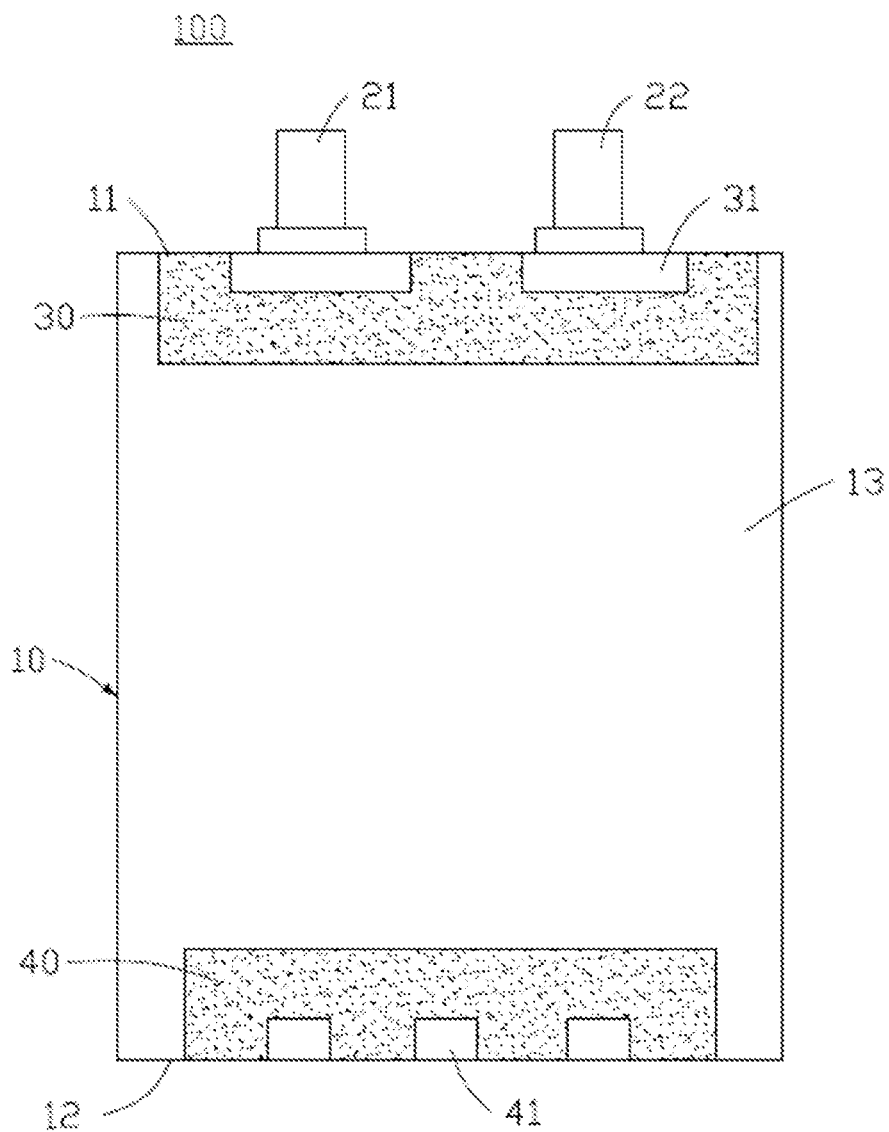
FIG. 1 is a schematic structural diagram of a battery cell according to an embodiment of this application.

Cell 100
Electrode assembly 10
First connecting piece 30
Second connecting piece 40
First end face 11
Second end face 12
First surface 13
Second surface 14
First tab 21
Second tab 22
First via hole 31
Second via hole 41
Notch 33
First substrate layer 301
First bonding layer 302
First electrode plate 101
Separator 102
Second electrode plate 103
Third connecting piece 50
Second substrate layer 51
Second bonding layer 52
Third bonding layer 53
Battery 200
Housing 210
Electric device 300

This application is further described below with reference to the following specific embodiments and the foregoing drawings.

DETAILED DESCRIPTION

The following describes the technical solutions in the embodiments of this application clearly and thoroughly with reference to the drawings herein. Evidently, the described embodiments are merely a part of but not all of the embodiments of this application.

It needs to be noted that, unless otherwise defined, all technical and scientific terms used herein have the same meanings as usually understood by a person skilled in the technical field of this application. The terms used in the embodiments of this application are intended only for describing specific embodiments rather than for limiting this application.

The following describes some embodiments of this application in detail with reference to drawings. To the extent that no conflict occurs, the following embodiments and the features in the embodiments may be combined with each other.

Referring to FIG. 1, an embodiment of this application provides a battery cell 100, including an electrode assembly 10, a tab, a first connecting piece 30, and a second connecting piece 40.

The electrode assembly 10 is approximately rectangular (with a side face that may be flat or curved). The electrode assembly includes a first end face 11 and a second end face 12 that are disposed opposite to each other, and a first surface 13 and a second surface 14 that are connected to the first end face 11 and the second end face 12 respectively (referring to FIG. 4). The first surface 13 is disposed opposite to the second surface 14. The tab protrudes from the first end face 11 to connect to an external component. The tab includes a first tab 21 and/or a second tab 22. The polarity of the first tab 21 is opposite to the polarity of the second tab 22. In this embodiment, the tab includes a first tab 21 and a second tab 22.

Figure 2A:
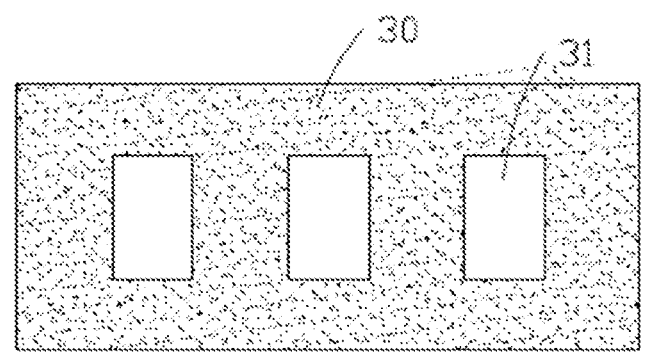
FIG. 2A is a schematic structural diagram of a first connecting piece and a second connecting piece according to an embodiment of this application.

Referring to FIG. 1 and FIG. 2A, the first connecting piece 30 is approximately rectangular. A plurality of first via holes 31 are made on the first connecting piece 30 to serve as electrolyte conduits. At least a part of the first via holes 31 are available for threading out the tab. The number of the first via holes 31 is greater than or equal to the number of the first tabs 21 and the second tabs 22. Specifically, when the tab protruding from the first end face 11 just includes the first tab 21 or the second tab 22, the number of the first via holes 31 is greater than or equal to one. When the tab protruding from the first end face 11 includes the first tab 21 and the second tab 22, the number of the first via holes 31 is greater than or equal to two. The first connecting piece 30 surrounds the first end face 11 and is connected to the first surface 13 and the second surface 14 separately so as to tightly clamp the first end face 11 of the electrode assembly 10 in a direction in which the first surface 13 extends toward the second surface 14 (that is, in the thickness direction H of the electrode assembly 10, referring to FIG. 4). In this way, the first end face 11 is fastened, and shrinkage of the separator 102 (referring to FIG. 4) located at any position on the first end face 11 is prevented. In this embodiment, the locations of the first via holes 31 correspond to the location of the first end face 11. At least a part of the first end face 11 is exposed from each of the first via holes 31. In another embodiment, the locations of the first via holes 31 other than the first via hole 31 corresponding to the tab correspond to the first surface 13 or the second surface 14. The corresponding first surface 13 or second surface 14 is exposed from the first via holes 31. In another embodiment, the locations of the first via holes 31 may correspond to the first end face 11, the first surface 13, and the second surface 14 instead, so as to expose a part of the first end face 11, a part of the first surface 13, and a part of the second surface 14, without being limited by this application.

The structure of the second connecting piece 40 is approximately the same as the structure of the first connecting piece 30, and is approximately rectangular. A plurality of second via holes 41 are made on the second connecting piece to serve as electrolyte conduits. The second connecting piece 40 surrounds the second end face 12 and is connected to the first surface 13 and the second surface 14 separately so as to tightly clamp the second end face 12 of the electrode assembly 10 in the thickness direction H of the electrode assembly 10. In this way, the second end face 12 is fastened, and shrinkage of the separator located at any position on the second end face 12 is prevented. In this embodiment, the locations of the second via holes 41 correspond to the location of the second end face 12. At least a part of the second end face 12 is exposed from each of the second via holes 41. In another embodiment, the locations of the second via holes 41 correspond to the first surface 13 or the second surface 14. The corresponding first surface 13 or second surface 14 is exposed from the second via holes 41. In another embodiment, the locations of the second via holes 41 may correspond to the first end face 11, the first surface 13, and the second surface 14 instead, so as to expose a part of the first end face 11, a part of the first surface 13, and a part of the second surface 14, without being limited by this application.

Figure 2B:
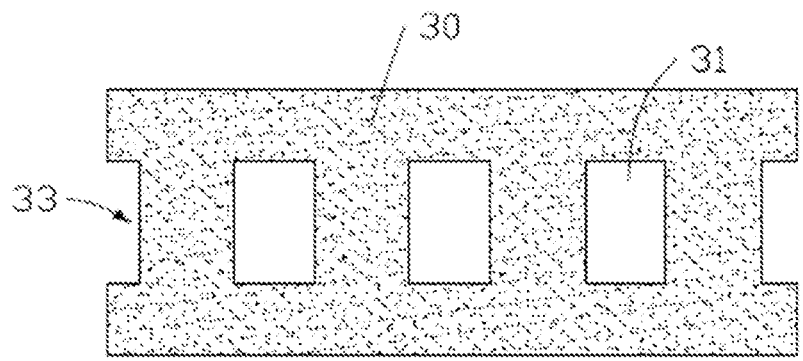
FIG. 2B is a schematic structural diagram of a first connecting piece according to another embodiment of this application.

Referring to FIG. 2B, in some embodiments, notches 33 are made at both ends of the first connecting piece 30 to serve as electrolyte conduits.

Figure 3:
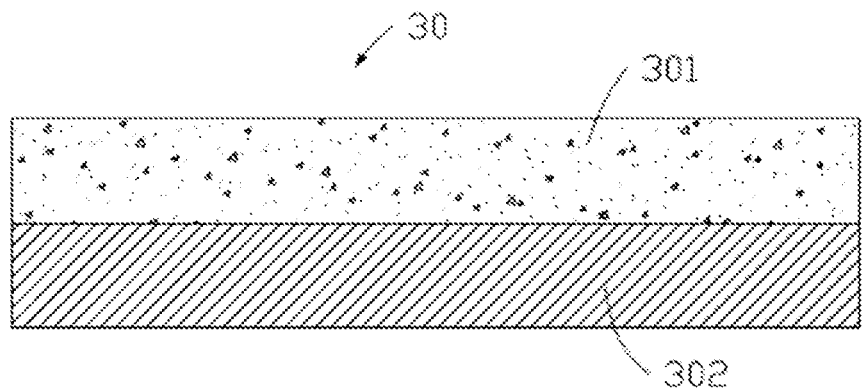
FIG. 3 is a schematic structural diagram of a first connecting piece according to another embodiment of this application.

Referring to FIG. 3, in some embodiments, both the first connecting piece 30 and the second connecting piece 40 are structural adhesive tape, and bond to the electrode assembly 10. Specifically, the first connecting piece 30 and the second connecting piece 40 each include a first substrate layer 301 and a first bonding layer 302 disposed on the first substrate layer 301. The first bonding layer 302 bonds to the electrode assembly 10. The material of the first substrate layer 301 may be PET (polyethylene terephthalate plastic). The material of the first bonding layer 302 may be acrylate. In other embodiments, the first connecting piece 30 and the second connecting piece 40 may be binding tape instead. The binding tape is connected to the electrode assembly through an adhesive, without being limited in this application.

Figure 4:
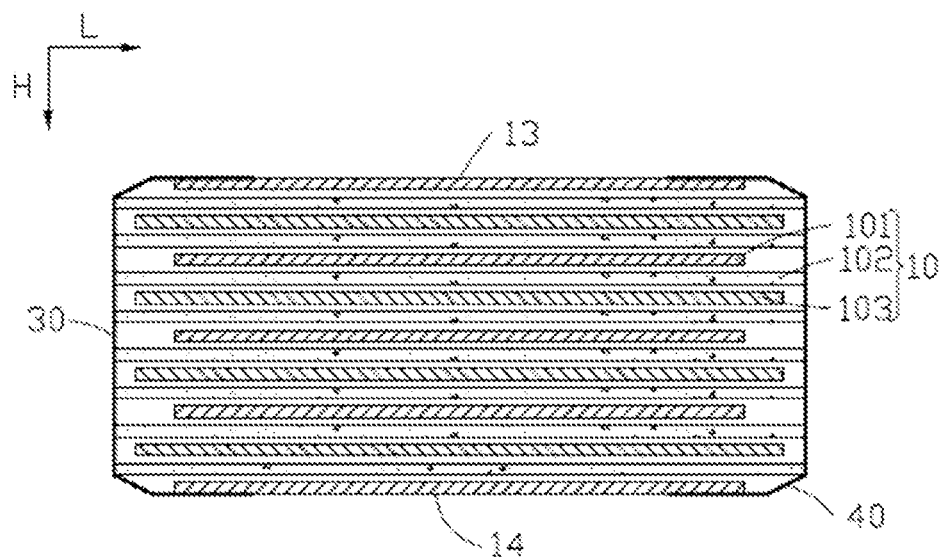
FIG. 4 is a schematic structural diagram of a battery cell according to another embodiment of this application.

Referring to FIG. 4, the electrode assembly 10 includes a first electrode plate 101, a separator 102, and a second electrode plate 103. The separator 102 is disposed between the first electrode plate 101 and the second electrode plate 103. The separator 102 is configured to prevent direct contact between the first electrode plate 101 and the second electrode plate 103, so as to prevent a short circuit of the electrode assembly 10. The electrode assembly 10 is formed by sequentially winding or stacking the first electrode plate 101, the separator 102, and the second electrode plate 103. In some embodiments, the edges of the separator 102 at both the first end face and the second end face exceed the corresponding edges of the first electrode plate 101 and the second electrode plate 103. The first connecting piece 30 and/or the second connecting piece 40 are connected to an excess part of the separator 102 separately. In this embodiment, both the first connecting piece 30 and the second connecting piece 40 are connected to the excess part of the separator 102, without being limited in this application. With the first connecting piece 30 and/or the second connecting piece 40 connected to the excess part of the separator 102, the separator 102 is fixed in the length direction L of the electrode assembly 10 (the direction in which the first end face extends to the second end face), thereby further reducing shrinkage of the separator 102.

Figure 5:
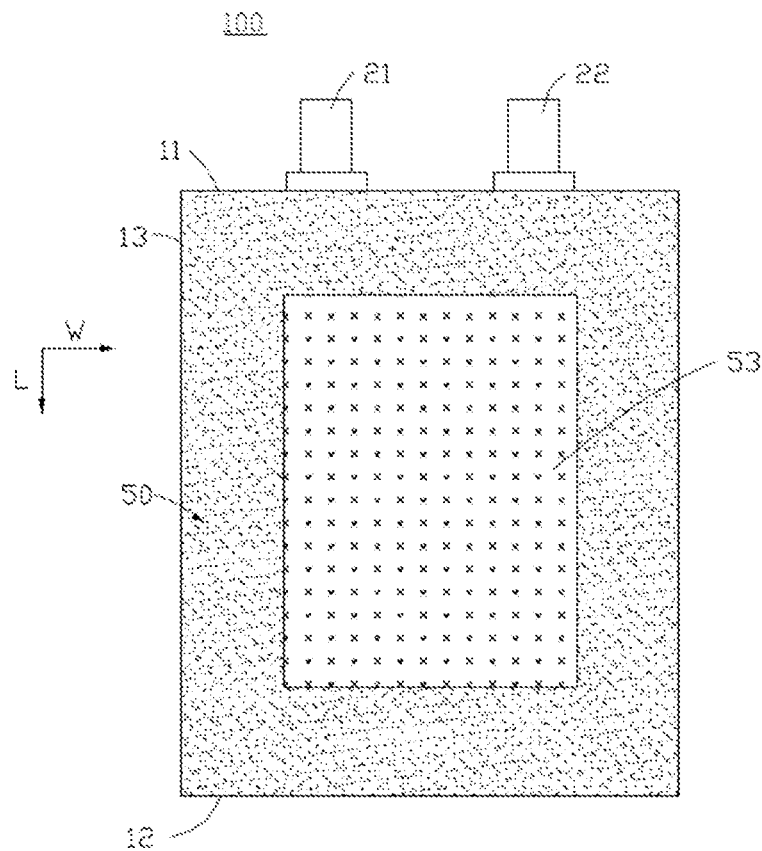
FIG. 5 is a schematic structural diagram of a first connecting piece, a second connecting piece, and a third connecting piece according to another embodiment of this application.
Figure 6:
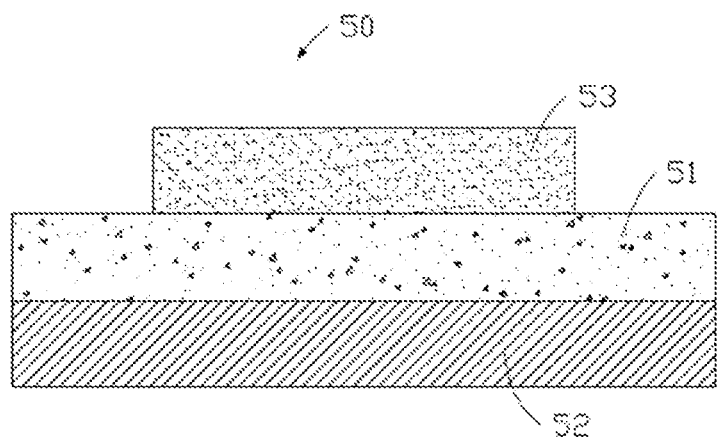
FIG. 6 is a schematic structural diagram of a battery cell according to another embodiment of this application.
Figure 7:
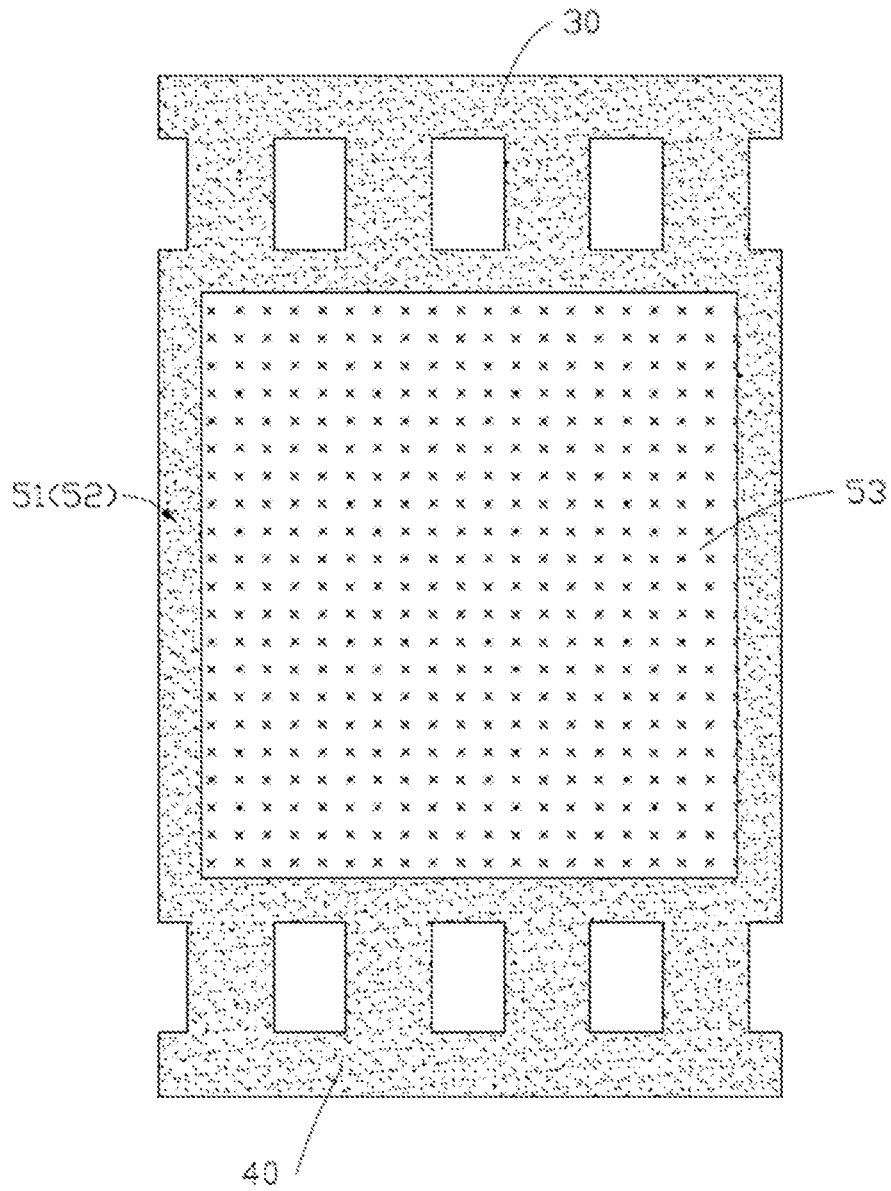
FIG. 7 is a schematic structural diagram of a third connecting piece according to an embodiment of this application.

Referring to FIG. 5, FIG. 6, and FIG. 7, in some embodiments, the battery cell 100 further includes a third connecting piece 50. The third connecting piece 50 is disposed on the first surface 13 or the second surface 14. The third connecting piece 50 is approximately rectangular, and includes a second substrate layer 51, a second bonding layer 52 disposed on the second substrate layer 51, and a third bonding layer 53 disposed on a side that is of the second substrate layer 51 and that faces back from the second bonding layer 52. The second bonding layer 52 bonds to the corresponding first surface 13 or second surface 14 of the electrode assembly 10. The third bonding layer 53 is disposed between the second substrate layer 51 and a housing of a battery. The third bonding layer 53 bonds to the housing when heated. With the third connecting piece 50 disposed, the electrode assembly 10 is connected to the housing of the battery, thereby avoiding defects caused by the movement of the electrode assembly 10 in the housing of the battery.

The material of the second substrate layer 51 may be the same as or different from the material of the first substrate layer 301. The material of the second bonding layer 52 may be the same as or different from the material of the first bonding layer 302. In this embodiment, the material of the second substrate layer 51 is the same as the material of the first substrate layer 301, and the material of the second bonding layer 52 is the same as the material of the first bonding layer 302. The material of the third bonding layer 53 is a hot-melt adhesive.

In some embodiments, the thicknesses of the first substrate layer 301, the second substrate layer 51, the first bonding layer 302, the second bonding layer 52, and the third bonding layer 53 are 1 µm to 60 µm. The bonding force between the first bonding layer 302 and the electrode assembly 10, the bonding force between the second bonding layer 52 and the electrode assembly 10, and the bonding force between the third bonding layer 53 and the housing of the battery are 100 N/n to 500 N/m.

In some embodiments, the area of the cross section that is of the second bonding layer 52 and that is parallel to the corresponding first surface 13 or second surface 14 is larger than the area of the cross section that is of the third bonding layer 53 and that is parallel to the corresponding first surface 13 or second surface 14. Specifically, in the length direction L of the electrode assembly 10, the length of the third bonding layer 53 is less than the length of the second bonding layer 52. In the width direction W of the electrode assembly 10 (the direction in which the first tab 21 extends toward the second tab 22), the width of the third bonding layer 53 is less than the width of the second bonding layer 52. In this embodiment, the size of the second substrate layer 51 is the same as the size of the second bonding layer 52 in the length direction L and the width direction W of the electrode assembly 10. The area of the cross section of the third bonding layer 53 is smaller than the area of the cross section of the second bonding layer 52. Therefore, the stress generated during dropping is concentrated on the edge of the third bonding layer 53 instead of the edge of the second bonding layer 52, thereby reducing stress concentration at the edge of the second bonding layer 52 and mitigating the problem of tearing the aluminum foil.

In some embodiments, in the length direction L and the width direction W of the electrode assembly 10, a spacing between the edge of the third bonding layer 53 and a corresponding edge of the second bonding layer 52 is 1 mm to 60 mm. Preferably, the spacing is 4 mm to 10 mm.

Referring to FIG. 7, in some embodiments, the first connecting piece 30, the second connecting piece 40, and the third connecting piece 50 are integrally formed, thereby further improving safety of the battery in use. Specifically, the two ends of the second bonding layer 52 are connected to the first bonding layer 302 of the first connecting piece 30 and the first bonding layer 302 of the second connecting piece 40 respectively. The two ends of the second substrate layer 51 are connected to the first substrate layer 301 of the first connecting piece 30 and the first substrate layer 301 of the second connecting piece 40 respectively. The first connecting piece 30, the second connecting piece 40, the second substrate layer 51, and the second bonding layer 52 are integrally formed into a whole piece of structural adhesive tape. The first connecting piece 30 and the second connecting piece 40 are two parts of the whole piece of structural adhesive tape. The remaining part of the whole piece of structural adhesive tape is the second substrate layer 51 and the second bonding layer 52.

Figure 8:
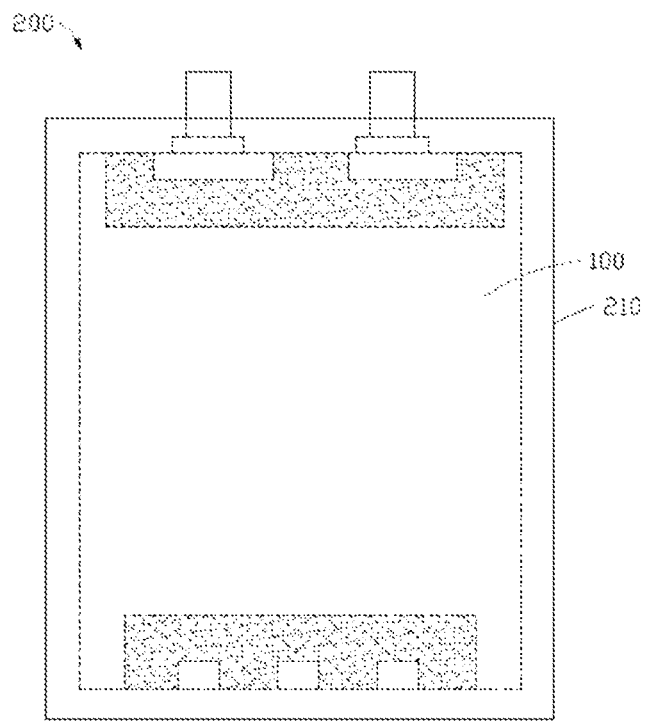
FIG. 8 is a schematic structural diagram of a battery according to an embodiment of this application.

Referring to FIG. 8, an embodiment of this application further provides a battery 200, including a housing 210 and the foregoing battery cell 100. The battery cell 100 is disposed in the housing 210. The battery 200 may be any type of primary batteries, secondary batteries, fuel cells, solar cells, and capacitors (such as supercapacitors). Especially, the secondary battery may be a lithium secondary battery, for example, a lithium metal secondary battery, a lithium-ion secondary battery, a lithium polymer secondary battery, or a lithium-ion polymer secondary battery.

Figure 9:
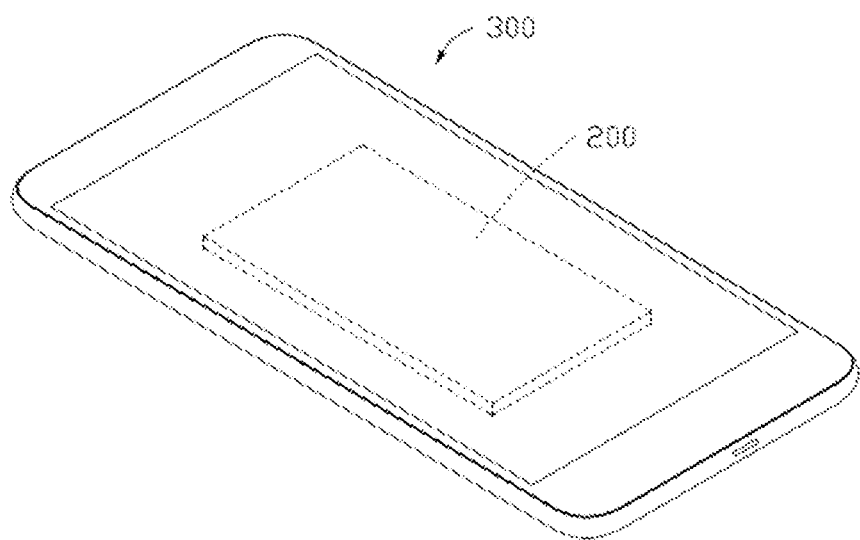
FIG. 9 is a schematic structural diagram of an electric device according to an embodiment of this application.

Referring to FIG. 9, an embodiment of this application further provides an electric device 300, including the foregoing battery 200. The electric device 300 according to this application may be, but is not limited to: a notebook computer, a pen-inputting computer, a mobile computer, an e-book player, a portable phone, a portable fax machine, a portable photocopier, a portable printer, a stereo headset, a video recorder, a liquid crystal display television set, a handheld cleaner, a portable CD player, a mini CD-ROM, a transceiver, an electronic notepad, a calculator, a memory card, a portable voice recorder, a radio, a backup power supply, a motor, a car, a motorcycle, a power-assisted bicycle, a bicycle, a lighting appliance, a toy, a game machine, a watch, an electric tool, a flashlight, a camera, a large household battery, a lithium-ion capacitor, or the like.

In this embodiment of this application, the first connecting piece 30 and the second connecting piece 40 that each are a whole piece are disposed on the first end face 11 and the second end face 12 of the electrode assembly 10 respectively. The first end face 11 and the second end face 12 are clamped tightly in the thickness direction of the electrode assembly 10, thereby avoiding shrinkage of the separator located at any position of the first end face 11 and the second end face 12 and improving safety.

What is disclosed above is merely exemplary embodiments of this application, and in no way constitutes a limitation on the protection scope of this application. Therefore, any equivalent variations made based on the claims of this application still fall within the scope covered by this application.

What is claimed is:

1. A battery cell, comprising:
   an electrode assembly and a tab, wherein the electrode assembly comprises a first end face, a second end face disposed opposite to the first end face, a first surface and a second surface that are connected to the first end face and the second end face respectively, and the tab protrudes from the first end face;
   a first connecting piece, wherein the first connecting piece extends from the first surface to the second surface and surrounds the first end face; the first connecting piece is connected to the first surface and the second surface separately, a first via hole is provided on the first connecting piece, and the tab is threaded out of the first via hole, and a part of the first surface is exposed from the first via hole; and
   a second connecting piece, wherein the second connecting piece extends from the first surface to the second surface and surrounds the second end face; the second connecting piece is connected to the first surface and the second surface separately, and a plurality of second via holes are provided on the second connecting piece, and an other part of the first surface is exposed from at least one of the plurality of second via holes.

2. The battery cell according to claim 1, wherein the electrode assembly is formed by sequentially stacking and then winding a first electrode plate, a separator, and a second electrode plate; or the electrode assembly is formed by sequentially stacking the first electrode plate, the separator, and the second electrode plate; and
   edges of the separator at both the first end face and the second end face exceed corresponding edges of the first electrode plate and the second electrode plate, and the first connecting piece and/or the second connecting piece are connected to an excess part of the separator separately.

3. The battery cell according to claim 1, wherein the first connecting piece and the second connecting piece each comprise a first substrate layer and a first bonding layer disposed on the first substrate layer, and the first bonding layer bonds to the electrode assembly.

4. The battery cell according to claim 3, further comprising a third connecting piece disposed on the first surface or the second surface, the third connecting piece comprises a second substrate layer and a second bonding layer disposed on the second substrate layer, and the second bonding layer bonds to the electrode assembly.

5. The battery cell according to claim 4, wherein the third connecting piece further comprises a third bonding layer, the third bonding layer is disposed between the second substrate layer and a housing of a battery, and the third bonding layer bonds to the housing when heated.

6. The battery cell according to claim 5, wherein an area of a cross section of the second bonding layer parallel to the corresponding first surface or second surface is larger than an area of a cross section of the third bonding layer parallel to the corresponding first surface or second surface.

7. The battery cell according to claim 5, wherein in a length direction or a width direction of the electrode assembly, a spacing between an edge of the third bonding layer and a corresponding edge of the second bonding layer is 1 mm to 60 mm.

8. The battery cell according to claim 4, wherein the first connecting piece, the second connecting piece, and the third connecting piece are integrally formed.

9. A battery, comprising a housing and a battery cell disposed in the housing, the battery cell comprising:
   an electrode assembly and a tab, wherein the electrode assembly comprises a first end face, a second end face disposed opposite to the first end face, a first surface and a second surface that are connected to the first end face and the second end face respectively, and the tab protrudes from the first end face;
   a first connecting piece, wherein the first connecting piece extends from the first surface to the second surface and surrounds the first end face; the first connecting piece is connected to the first surface and the second surface separately, a first via hole is provided on the first connecting piece, and the tab is threaded out of the first via hole, and a part of the first surface is exposed from the first via hole; and
   a second connecting piece, wherein the second connecting piece extends from the first surface to the second surface and surrounds the second end face; the second connecting piece is connected to the first surface and the second surface separately, and a plurality of second via holes are provided on the second connecting piece, and an other part of the first surface is exposed from at least one of the plurality of second via holes.

10. The battery according to claim 9, wherein the electrode assembly is formed by sequentially stacking and then winding a first electrode plate, a separator, and a second electrode plate; or the electrode assembly is formed by sequentially stacking the first electrode plate, the separator, and the second electrode plate; and edges of the separator at both the first end face and the second end face exceed corresponding edges of the first electrode plate and the second electrode plate, and the first connecting piece and/or the second connecting piece are connected to an excess part of the separator separately.

11. The battery according to claim 9, wherein the first connecting piece and the second connecting piece each comprise a first substrate layer and a first bonding layer disposed on the first substrate layer, and the first bonding layer bonds to the electrode assembly.

12. The battery according to claim 11, further comprising a third connecting piece disposed on the first surface or the second surface, the third connecting piece comprises a second substrate layer and a second bonding layer disposed on the second substrate layer, and the second bonding layer bonds to the electrode assembly.

13. The battery according to claim 12, wherein the third connecting piece further comprises a third bonding layer, the third bonding layer is disposed between the second substrate layer and a housing of a battery, and the third bonding layer bonds to the housing when heated.

14. The battery according to claim 13, wherein an area of a cross section of the second bonding layer parallel to the corresponding first surface or second surface is larger than an area of a cross section of the third bonding layer parallel to the corresponding first surface or second surface.

15. The battery according to claim 13, wherein in a length direction or a width direction of the electrode assembly, a spacing between an edge of the third bonding layer and a corresponding edge of the second bonding layer is 1 mm to 60 mm.

16. The battery according to claim 12, wherein the first connecting piece, the second connecting piece, and the third connecting piece are integrally formed.

17. An electric device, comprising a battery, the battery comprising a housing and a battery cell disposed in the housing, the battery cell comprising:

an electrode assembly and a tab, wherein the electrode assembly comprises a first end face, a second end face disposed opposite to the first end face, and a first surface and a second surface that are connected to the first end face and the second end face respectively, and the tab protrudes from the first end face;

a first connecting piece, wherein the first connecting piece extends from the first surface to the second surface and surrounds the first end face; the first connecting piece is connected to the first surface and the second surface separately, a first via hole is provided on the first connecting piece, and the tab is threaded out of the first via hole, and a part of the first surface is exposed from the first via hole; and a second connecting piece, wherein the second connecting piece extends from the first surface to the second surface and surrounds the second end face; the second connecting piece is connected to the first surface and the second surface separately, and a plurality of second via holes are provided on the second connecting piece, and an other part of the first surface is exposed from at least one of the plurality of second via holes.

18. The battery cell according to claim 1, wherein a part of the second surface is exposed from the first via hole; and an other part of the second surface is exposed from at least one of the plurality of second via holes.

19. The battery according to claim 9, wherein a part of the second surface is exposed from the first via hole; and an other part of the second surface is exposed from at least one of the plurality of second via holes.

20. The electric device according to claim 17, wherein a part of the second surface is exposed from the first via hole; and an other part of the second surface is exposed from at least one of the plurality of second via holes.

* * * * *